United States Patent
Yen et al.

(10) Patent No.: US 6,275,682 B1
(45) Date of Patent: Aug. 14, 2001

(54) RF SIGNAL TRANSMITTING DEVICE

(75) Inventors: An-Yu Yen; Ching-Wen Pan; Cheng-Kang Lee, all of Hsinchu (TW)

(73) Assignee: RF-Link Systems Inc., Hsinchu (TW)

( * ) Notice: Subject to any disclaimer, the term of this patent is extended or adjusted under 35 U.S.C. 154(b) by 0 days.

(21) Appl. No.: 09/218,532

(22) Filed: Dec. 21, 1998

(30) Foreign Application Priority Data

Aug. 14, 1998 (TW) .................................................. 87213398

(51) Int. Cl.[7] ...................................................... H04Q 7/20
(52) U.S. Cl. .................................. 455/66; 455/39; 455/91
(58) Field of Search ........................... 455/41, 66, 188.1, 455/188.2, 553, 552, 39, 70, 71, 91, 100, 101, 102, 103, 557; 364/701.01, 701.05; 345/126, 158, 172, 156, 161, 163, 167, 169, 2

(56) References Cited

U.S. PATENT DOCUMENTS

| | | |
|---|---|---|
| Re. 35,364 | 10/1996 | Heitschel et al. . |
| 4,170,757 * | 10/1979 | Skudera et al. ........................ 380/34 |
| 4,562,472 | 12/1985 | Carlson . |
| 4,750,118 | 6/1988 | Carl et al. . |
| 5,400,359 * | 3/1995 | Hikoso et al. ........................ 375/202 |
| 5,457,742 * | 10/1995 | Vallillee et al. ........................ 379/352 |
| 5,479,453 * | 12/1995 | Anvari et al. ........................ 375/348 |
| 5,548,831 | 8/1996 | Bijker et al. . |
| 5,583,891 * | 12/1996 | Espe et al. ............................ 375/346 |
| 5,831,366 * | 3/1999 | Bodenmann .......................... 455/66 |
| 5,943,042 * | 8/1999 | Siio .................................... 345/172 |
| 5,986,634 * | 11/1999 | Alioshin et al. ..................... 345/126 |
| 5,990,868 * | 11/1999 | Frederick ............................ 345/158 |
| 6,008,777 * | 12/1999 | Yiu ........................................ 345/2 |
| 6,131,130 * | 10/2000 | Ryzin .................................... 710/6 |

* cited by examiner

Primary Examiner—Tracy Legree
Assistant Examiner—Jean A Gelin
(74) Attorney, Agent, or Firm—Laff, Whitesel & Saret, Ltd.; J. Warren Whitesel

(57) ABSTRACT

A radio frequency (RF) signal transmitting device adapted to transmit signals between a computer and a plurality of wireless peripheral equipment is developed. The RF signal transmitting device includes a plurality of RF signal transmitters and an RF signal receiver. The RF signal transmitters are electrically connected to the plurality of wireless peripheral equipment, respectively, and each is provided for modulating an output signal therefrom into an RF signal with a specific carrier frequency and transmitting the RF signal. The RF signal receiver is electrically connected to the computer for synchronously receiving the RF signals from the RF signal transmitters and converting each of the RF signals to an operating signal to operate the computer.

7 Claims, 3 Drawing Sheets

RF SIGNAL TRANSMITTING DEVICE

FIELD OF THE INVENTION

The present invention relates to a radio frequency (RF) signal transmitting device, and more particularly to an RF signal transmitting device for transmitting signals between a computer and a plurality of wireless peripheral equipment.

BACKGROUND OF THE INVENTION

The personal computer has become an indispensable tool for modern people. The kind and application of peripheral equipment are diversified as the function of the personal computer becomes more powerful. For example, an input device has evolved from a conventional keyboard to a mouse essential for windows software, a joystick for playing a game, or even a handwritten input device and a voice input device. Those peripheral equipment fully occupy their user s work table. However, the convenience for a user to use a personal computer is quite restricted owing to the close and numerous connection cables between a personal computer and its peripheral equipment.

To overcome the above-mentioned drawback so as to increase the convenience in activity for a user, a manner of wireless connection between a personal computer and its peripheral equipment has been developed. For example, a wireless signal transmission was proposed by utilizing infrared rays due to its simply manufacturing method and low cost. However, there exists inconvenience and shortcoming because of its broadly directional characteristic and its transmission path being subject to be blocked by other matters. Thus another manner of wireless signal transmission using RF is developed and is extensively used now.

Please refer to FIG. 1 which is a block diagram showing a prior RF wireless manner of performing the connection and signal transmission between a personal computer 10 and each of peripheral equipment, respectively. Many kind of peripheral equipment are commonly used with the computer, such as a mouse device 11, a keyboard device 12, and a joystick 13, etc. At present, the prior wireless manner uses respective RF transmitters 111, 121, 131 and receivers 112, 122, 123 for performing the signal transmission. Apparently, the number of signal receivers needed for the signal transmission increases along with the number of peripheral equipment in use. That causes high cost, difficulty in the unification of hardware, and low operation rate. Therefore, it is tried by the applicant to deal with the situation encountered by the prior art.

SUMMARY OF THE INVENTION

The object of the present invention is to provide a single RF signal transmitting device for transmitting signals between a computer and a plurality of wireless peripheral equipment.

According to the present invention, the RF signal transmitting device includes (a) a plurality of RF signal transmitters electrically connected to the plurality of wireless peripheral equipment respectively, each of which is provided for modulating an output signal therefrom into an RF signal with a specific carrier frequency and transmitting the RF signal and (b) an RF signal receiver electrically connected to the computer for synchronously receiving the RF signals from the RF signal transmitters and converting each of them to an operating signal to operate the computer.

In accordance with another aspect of the present invention, the RF signal receiver further includes (a) a receiving antenna for receiving the RF signals synchronously, (b) a frequency reducer electrically connected to the receiving antenna for converting the RF signals to a plurality of intermediate frequency signals by decreasing the carrier frequencies of the RF signals, (c) a demodulator electrically connected to the frequency reducer for distinguishing and demodulating the intermediate frequency signals so as to obtain respective the output signals from the plurality of wireless peripheral equipment, and (d) a converting unit electrically connected to the demodulator for converting the output signals into the operating signals to operate the computer.

In accordance with another aspect of the present invention, the frequency reducer further includes an RF amplifier electrically connected to the receiving antenna for amplifying the RF signals to increase a signal-to-noise ratio of the RF signals, and a frequency-converting circuit electrically connected to the RF amplifier for converting the amplified RF signals into the plurality of intermediate frequency signals, correspondingly.

In accordance with another aspect of the present invention, the RF amplifier includes a high-pass filter electrically connected to the receiving antenna for filtering the RE signals to block a low frequency noise included in the RF signals, and a first amplify unit electrically connected to the high-pass filter for increasing the amplitude of the filtered RF signals.

In accordance with another aspect of the present invention, the frequency-converting circuit includes a local oscillator providing an oscillatory signal with a constant frequency, and a mixer electrically connected to the first amplifying unit and the local oscillator for mixing plurality of intermediate frequency signals equal to the differences between the RF signals and the oscillatory signal.

In accordance with another aspect of the present invention, the constant frequency is 896 MHz.

In accordance with another aspect of the present invention, the demodulator includes a plurality of bandpass filters electrically connected to the frequency reducer, each of which passes a corresponding one of the intermediate frequency signals, and blocking others of the intermediate frequency signals, a plurality of second amplifing units each electrically connected to a corresponding one of the bandpass filters for amplifying the corresponding intermediate frequency signal, and a plurality of demodulating units each of which is electrically connected to a corresponding one of the second amplifying units for demodulating the corresponding intermediate frequency signal so as to obtain the output signals.

In accordance with another aspect of the present invention, the converting unit is a microprocessor for converting the obtained output signals to the operating signals for the computer.

The present invention may best be understood through the following description with reference to the accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
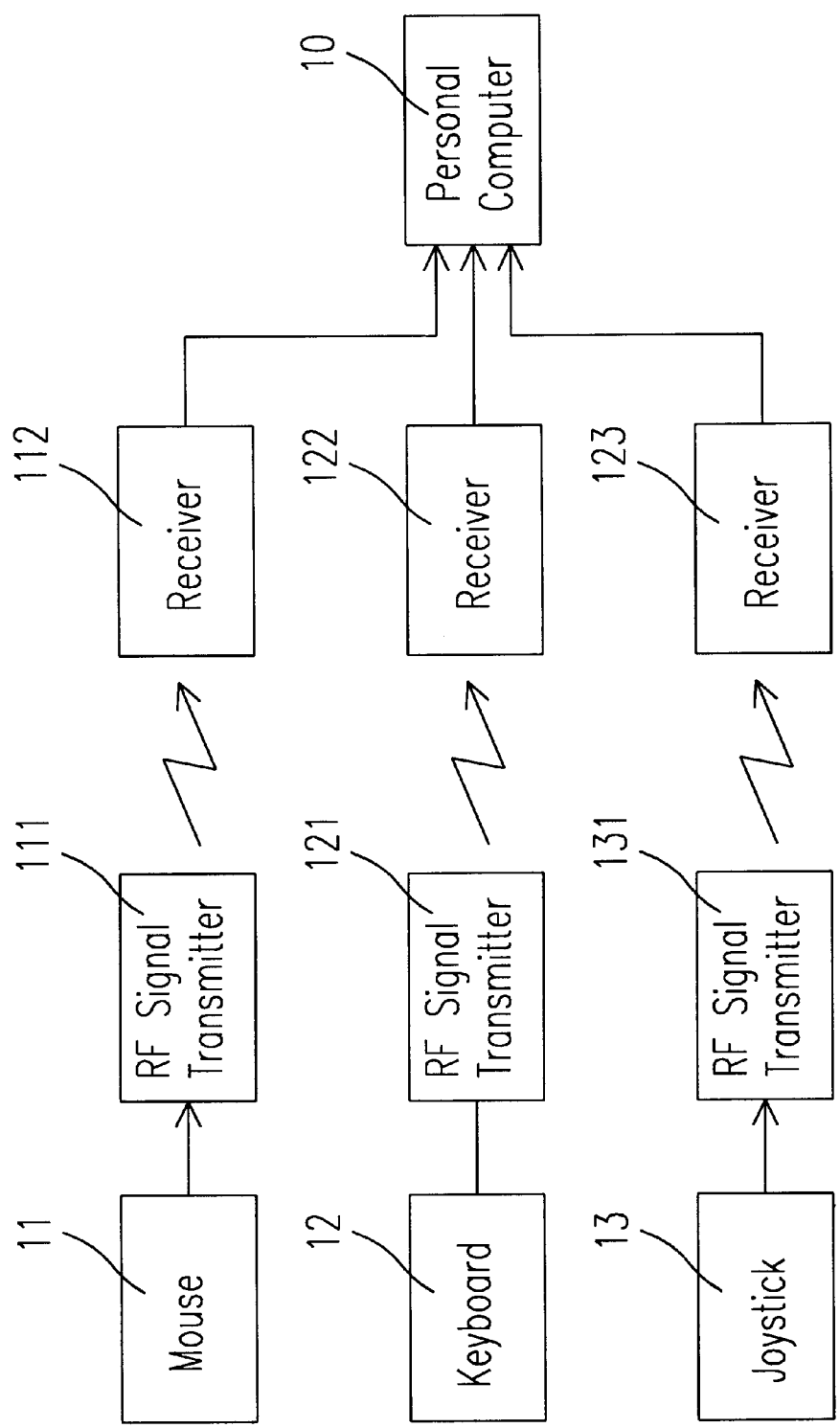
FIG. 1 is a block diagram showing a prior RF wireless manner of performing the connection and signal transmission between a personal computer and each of peripheral equipment, respectively.
Figure 2:
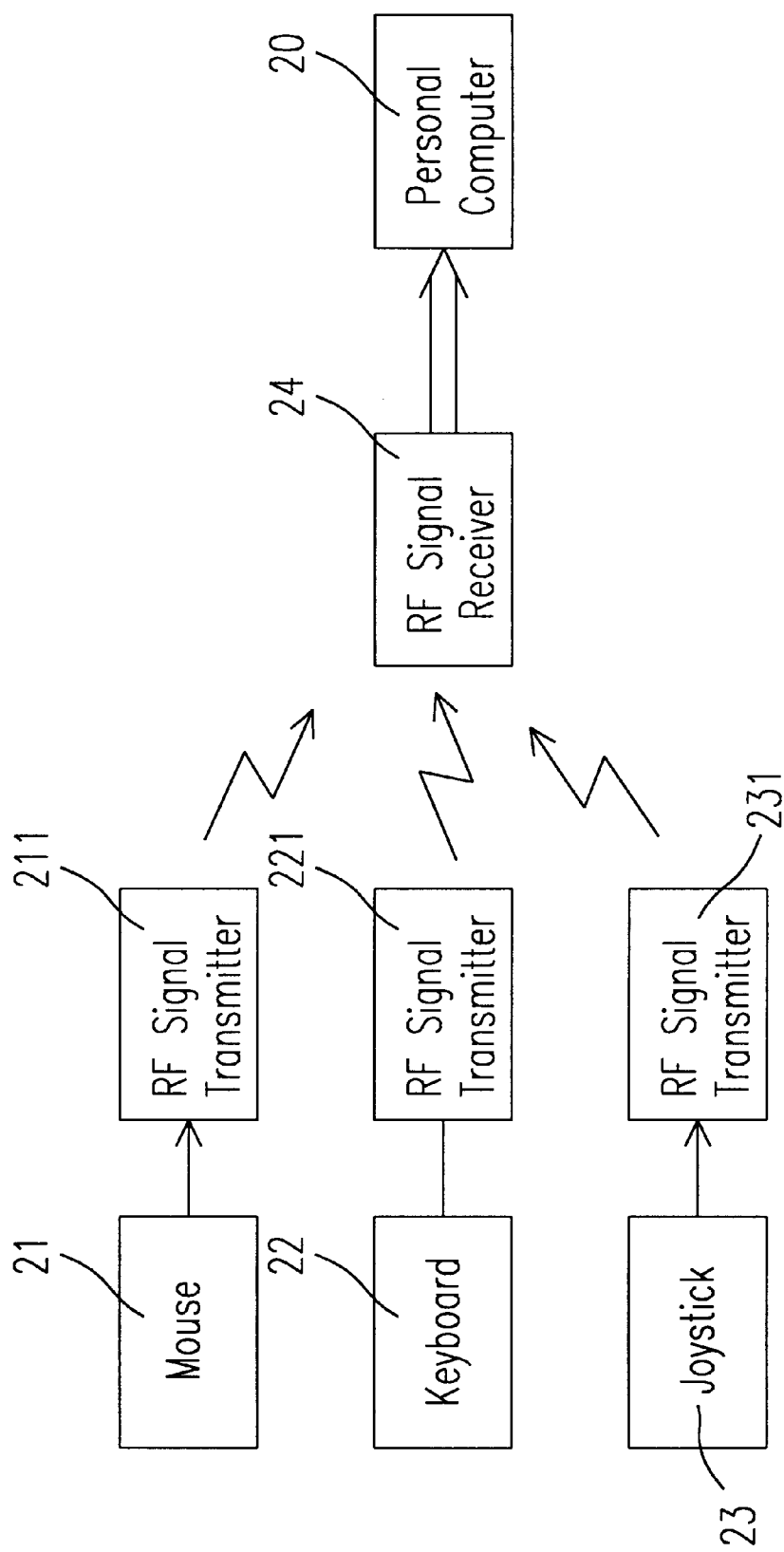
FIG. 2 is a schematic diagram showing a preferred embodiment of an RF signal transmitting device according to the present invention.

Please refer to FIG. 2 which is a schematic diagram showing a preferred embodiment of an RF signal transmitting device according to the present invention wherein a personal computer 10 is connected to several peripheral equipment such as a mouse device 21, a keyboard device 22, and a joystick device 23 simultaneously, and each of peripheral equipment includes respective RF signal transmitters 211, 221, 231. Each of RF signal transmitters is provided for modulating an output signal from the respective peripheral equipment into an RF signal and transmitting the RF signal. The plurality of RF signals have different specific carrier frequencies f1, f2, f3, respectively, and are synchronously received by an RF signal receiver 24 for being transmitted to the computer 10 so as to perform a signal transmission function.

Figure 3:
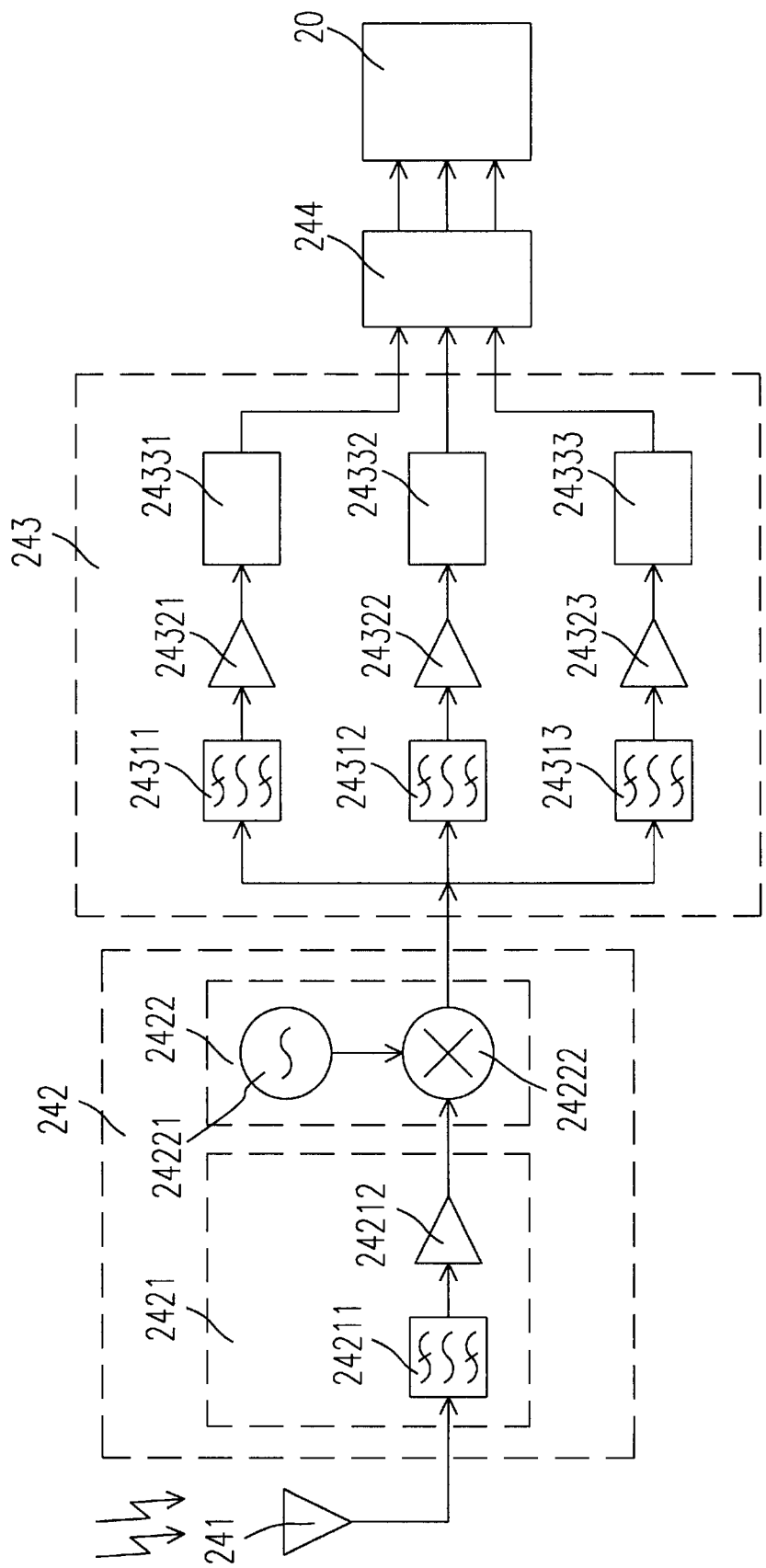
FIG. 3 is a block diagram showing the components of the RF signal receiver 24 according to the present invention.

One of the characteristics of the present invention is to integrate RF signal receivers into a single one capable of performing the function of transmitting a plurality of RF signals from a plurality of peripheral equipment. Please refer to FIG. 3 which is a block diagram showing all components of the RF signal receiver 24 according to the present invention, wherein the receiving antenna 241 synchronously receives the RF signals with different carrier frequencies, preferably 906.7 mHz, 902.5 MHz, and 902 mHz and transmits the RF signals to the frequency reducer 242 which includes an RF amplifier 2421 and a frequency-converting circuit 2422 for converting the RF signals to a plurality of intermediate frequency signals by decreasing the carrier frequencies of the RF signals. The RF amplifier 2421 is provided for amplifying the RF signals to increase a signal-to noise ratio of the RF signals. The RF amplifier 2421 further includes a high-pass filter 24211 and a first amplifying unit 24212. The high-pass filter 24211 is used for filtering the RF signals to block a low frequency noise included in the RF signals and outputs the plurality of filtered RF signals to the first amplifying unit 24212 for increasing the amplitude of the filtered RF signals.

The frequency-converting circuit 2422 is provided for converting the amplified RF signals into the plurality of intermediate frequency signals, correspondingly. The frequency-converting circuit 2422 further includes a local oscillator 24221 and a mixer 24222. The local oscillator 24221 provides an oscillatory signal with a constant frequency, e.g. 896 MHz. The mixer 24222 is used for respectively mixing the RF signals with the oscillatory signal to output the plurality of intermediate frequency signals for example, 10.7 MHz, 6.5 MHz, and 6.0 MHz equal to the differences between the RF signals and the oscillatory signal.

The above-mentioned intermediate frequency signals are distinguished and demodulated by a demodulator 243 so as to obtain the output signals from the plurality of wireless peripheral equipment respectively. The output signals are then converted by a converting unit 244 into the operating signals to operate the computer 10. The demodulator 243 (or frequency-division multiplex demodulator) filer includes a plurality of bandpass filters 24311, 24312, 24313, a plurality of second amplifing units 24321, 24322, 24323, and a plurality of demodulating units 24331, 24332, 24333. Each of the bandpass filters 24311, 24312, 24313 passes a corresponding one of the intermediate frequency signals and blocks other intermediate frequency signals. Each of the second amplifying units 24321, 24322, 24323 amplifies and transmits the corresponding intermediate frequency signal. Each of the demodulating units 24331, 24332, 24333 demodulates the corresponding intermediate frequency signal so as to obtain the output signals from the plurality of peripheral equipment.

Finally, a converting unit 244 or a microprocessor converts the obtained output signals to the operating signals for the computer 10. The operating signal is one selected from ASCII code for a keyboard, RS232 format for a mouse, PS2 format, or data transmitting format for a peripheral equipment such as commonly used serial bus.

Thus, the present invention integrates several RF signal receivers into a single one. It not only omits high-cost high frequency equipment (such as local oscillator and mixer) to be disposed in the respective receiver for the prior art but also simplifies the installation of peripheral equipment to a computer.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency (RF) signal transmitting device, adapted to transmit signals between a computer and a plurality of wireless peripheral equipment, comprising:

a plurality of RF signal transmitters electrically connected to said plurality of wireless peripheral equipment for modulating output signals from said plurality of wireless peripheral equipment into RF signals, respectively, each RF signal having a specific carrier frequency which is different from other carrier frequencies, and said plurality of RF signal transmitters transmitting said RF signals outwardly;

a receiving antenna capable of synchronously receiving said RF signals;

a single frequency reducer electrically connected to said receiving antenna for equally shifting said RF signals to corresponding intermediate frequency (IF) signals;

a plurality of demodulators electrically connected to said single frequency reducer for distinguishing and demodulating said IF signals, respectively, so as to isolate said output signals; and a converting unit electrically connected to said demodulators for converting said output signals into respective operating signals to operate said computer.

2. The device according to claim 1 wherein said frequency reducer further comprises:

an RF amplifier electrically connected to said receiving antenna for amplifying said RF signals to increase a signal-to-noise ratio of said RF signals; and a frequency-converting circuit electrically connected to said RF amplifier for converting said amplified RF signals into said corresponding IF signals.

3. The device according to claim 2 wherein said RF amplifier comprises:
   a high-pass filter electrically connected to said receiving antenna for filtering said RF signals to block a low frequency noise included in said RF signals;and
   a first amplifying unit electrically connected to said high-pass filter for increasing the amplitude of said filtered RF signals.

4. The device according to claim 3 wherein said frequency-converting circuit comprises:
   a local oscillator providing an oscillatory signal with a constant frequency; and
   a mixer electrically connected to said first amplifying unit and said local oscillator for respectively mixing said RF signals with said oscillatory signal to output said corresponding IF signals equal to the differences between said RF signals and said oscillatory signal.

5. The device according to claim 4 wherein said constant frequency is 896 MHz.

6. The device according to claim 1 wherein each of said demodulators comprises:
   a bandpass filter electrically connected to said frequency reducer, passing therethrough a corresponding one of said intermediate frequency signals, and blocking the others of said intermediate frequency signals;
   a second amplifying unit electrically connected to said bandpass filter for amplifying said corresponding one of said intermediate frequency signals; and
   a demodulating unit electrically connected to said second amplifying unit for demodulating said corresponding one of said intermediate frequency signals so as to isolate said output signals.

7. The device according to claim 1 wherein said converting unit includes a microprocessor for converting said isolated output signals to said respective operating signals for said computer.

* * * * *